United States Patent [19]

Bederke et al.

[11] Patent Number: 5,426,138

[45] Date of Patent: Jun. 20, 1995

US005426138A

[54] BINDING-AGENT COMPOSITION, ITS PRODUCTION, COATING AGENT CONTAINING SAID BINDING AGENT, AND THE USE THEREOF

[75] Inventors: Klaus Bederke, Sprockhövel; Hermann Kerber; Walter Schubert, both of Wuppertal; Thomas Brock, Hürth; Fritz Sadowski, Brauweiler; Helmut Löffler, Brühl, all of Germany

[73] Assignee: Herberts GmbH, Wuppertal, Germany

[21] Appl. No.: 235,206

[22] Filed: Apr. 29, 1994

Related U.S. Application Data

[63] Continuation of Ser. No. 974,656, Nov. 12, 1992, abandoned.

[30] Foreign Application Priority Data

Nov. 15, 1991 [DE] Germany .................. 41 37 615.3

[51] Int. Cl.6 .................... C08K 3/20; C08L 63/02
[52] U.S. Cl. ........................... 523/415; 525/53 D
[58] Field of Search .............. 523/414, 415; 525/53 D

[56] References Cited

U.S. PATENT DOCUMENTS 3,290,350  12/1966  Hoover .................... 526/312
4,990,577  2/1991  Noomen et al. ............ 525/449

FOREIGN PATENT DOCUMENTS 4027259  3/1992  Germany .

Primary Examiner—Melvyn I. Marquis
Assistant Examiner—D. Aylward
Attorney, Agent, or Firm—Michael O. Warnecke; Richard A. Speer; Keck, Mahin & Cate

[57] ABSTRACT

A binding-agent composition for solvent-based or aqueous coating agents can be cured at low temperature to produce coatings which are non-yellowing and resistant to solvents. The binding-agent composition contains binding-agent components based on polyethers, polyesters, polyether polyesters and/or (meth)acrylic copolymers with, in each case, at least one acryloyl group and at least one epoxide group in the molecule, whereby the acryloyl groups and epoxide groups are present in the ratio 2:8 to 8:2. Also included are several polyamines as curing agents in a proportion of equivalent weights ranging from 2:0.5 to 1:1.5. The binding agents are used in pigmented and pigment-free lacquers, for use particularly in multi-layer lacquering.

5 Claims, No Drawings

BINDING-AGENT COMPOSITION, ITS PRODUCTION, COATING AGENT CONTAINING SAID BINDING AGENT, AND THE USE THEREOF

This is a continuation of application Ser. No. 07/974,656 filed on Nov. 12, 1992, the text of which is hereby incorporated by reference now abandoned.

FIELD OF THE INVENTION

The invention relates to a binding-agent composition suitable for the production of solvent-based and/or water-based coating agents.

BACKGROUND OF THE INVENTION

In EP-A-0 002 801 two-component lacquer binding agents are described in which crosslinking of the two components is effected by the reaction of amido amides with acryloyl-unsaturated groups. This results in a lacquer film that has begun to dry being formed very quickly on the surface; curing is only complete, however, after several weeks.

In EP-A-0 179 954 a two-component lacquer binding agent is described in which epoxide-functionalised compounds are cured with amine-functionalised crosslinking agents. These curing agents can in addition be blocked by reaction of the amine groups with aldehydes or ketones to form a Schiff's base. With this system too, a hard and gasoline-resistant film is formed only after several days. In the older German Patent Application P 40 27 259 a two-component lacquer is described in which epoxide-functionalised and acryloyl-functionalised compounds are cured with amine-functionalised crosslinking agents. These curing agents can in addition be blocked by reaction of the amine groups with aldehydes or ketones to form a Schiff's base. Not mentioned here is the production and use of a curing agent formed by reaction of α-dimethyl-m-isopropenylbenzylisocyanate (referred to hereinafter as TMI) with mono- or diketimines which have an OH or sec. NH group.

SUMMARY OF THE INVENTION

The object of the invention is the provision of a two-component binding agent suitable for solvent-based or aqueous coating agents which, even at low temperatures, for example at room temperature, can be rapidly cured to form films which are non-yellowing, resistant to solvents and gasoline and, in particular, very full-bodied and glossy.

It has been shown that this task can be solved by a binding-agent system in which a film-forming agent, containing both epoxide and acryloyl groups in a numeric ratio of 2:8 to 8:2, is crosslinked with an amine-functionalised curing agent, which can be blocked. The combination of epoxide and acryloyl groups enables rapid initial drying and fast crosslinking, whereby effective evaporation of the solvent from a film containing the binding agent is also ensured. By the use of a polymeric crosslinking agent the film is given a very high sheen and, in the case of addition of a hydroxyfunctional ketimine to a TMI copolymer via the urethane group formed, also a considerable degree of flexibility.

The object of the invention is therefore a binding-agent composition which is suitable for coating agents containing solvents and/or water and which has the composition stated in the claims.

DETAILED DESCRIPTION OF THE PREFERRED EMBODIMENTS

The invention relates in particular to a binding-agent composition based on a glycidyl- and acryloyl-functional component A and a polyamine component B, which, according to a preferred embodiment, contains as binding-agent component A a glycidyl-functional and an acryloyl-functional compound each having at least one functional group of the formula

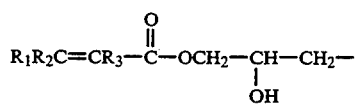

and/or

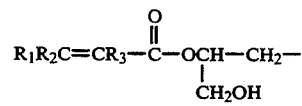

and

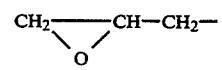

where $R_1$, $R_2$ and $R_3$ independently of each other can be a hydrogen atom or a straight or branched alkyl residue with 1 to 10 carbon atoms, and where I and II are linked to a residue of one or several a) polyols from the group of straight or branched cycloaliphatic, aliphatic and/or aromatic diols or polyols having 2 to 12 carbon atoms, with a number average molecular weight (Mn) of up to 2000, b) polyesters with a number average molecular weight (Mn) of 500 to 2000 and/or c) poly(meth)acrylic acid ester, optionally copolymerised with α,β-unsaturated monomers, having a number average molecular weight (Mn) of 1000 to 10000;

and which by way of curing component B contains a polyamine component with at least two primary amine functions, which can be blocked, produced by reaction of TMI copolymers having a number average molecular weight (Mn) of 1000 to 10000 with mono- or diketimines which contain either a hydroxy or a secondary amine function.

The numeric ratio of epoxide to acryloyl groups in the binding agent lies between 2:8 and 8:2, preferably between 3:7 and 7:3. The numeric ratio refers to the ratio of the total number of epoxide groups to the total number of acryloyl groups in one molecule.

The binding-agent component of the binding agent according to the invention, which contains at least one glycidyl function and at least one acryloyl function, can for example be produced by causing di- or polyepoxides to react with ,B-unsaturated carboxylic acids, whereby the oxirane ring is opened. Customary di- or polyepoxides are, e.g., polyglycidyl ethers based on diethylene glycol, dipropylene glycol, polypropylene glycol with a number average molecular weight (Mn) of up to 2000, triglycidyl ethers of glycerine and/or di- or polyphenols such as Bisphenol A.

Further examples of di- or polyepoxides are those based on di- or polyglycidyl esters. Examples of these are reaction products of 1-hydroxy-2,3-epoxypropane with phthalic acid or terephthalic acid which form phthalic or terephthalic acid-bis-(2,3-epoxypropyl ester) or those of a diglycidyl ether of Bisphenol A with trimellitic acid anhydride which form polyesters having a number average molecular weight (Mn) of 500 to 2000.

Equally useable examples are glycidyl-functionalised (meth)acrylic polymers. Examples of these are copolymers of glycidyl (meth)acrylate, 1,2-epoxybutyl acrylate or 2,3-epoxycyclopentyl acrylate. By way of comonomers, esters of (meth)acrylic acid such as methyl, ethyl, butyl, isobutyl, ethylhexyl, cyclohexyl and/or lauryl acrylic can be chosen, and/or hydroxypropyl esters, and also of styrene, vinyl toluene and/or s-methyl styrenal The number average molecular weight can lie between 1000 and 10000, preferably around 2000 to 5000. Other copolymerisable glycidyl monomers are, e.g., allyl glycidyl ether or 3,4-epoxy-1-vinylcyclohexane. Production of the copolymers is effected by radical solution polymerisation which is familiar to one skilled in the art and requires no further elucidation. Hereinafter (meth)acrylic should be taken to mean acrylic and/or methacrylic.

In order to produce the film-forming component of the binding agents, the di- or polyepoxides can be reacted with, for example, singly or multiply unsaturated monocarboxylic acids having, e.g., 2 to 10, preferably 3 to 6, carbon atoms, such as cinnamic acid, crotonic acid, citraconic acid, sorbic acid, but preferably acrylic and/or methacrylic acid.

In order to synthesise the glycidyl- and acryloyl-functionalised compounds the reaction components can be heated in a solvent. Aprotic organic solvents are suitable as solvent. It is advantageous to carry out production in an atmosphere of inert gas. The unsaturated monocarboxylic acid is used in such an amount as to ensure that the desired numeric ratio of epoxide groups to acryloyl groups is obtained. The reaction is continued until such time as the unsaturated monocarboxylic acid employed has been consumed. The following is an example of synthesis of the epoxide- and acryloyl-functionalised compounds: the epoxide-functionalised compound is dissolved in an aprotic organic solvent in an atmosphere of inert gas and, e.g., heated to 80° C. The unsaturated monocarboxylic acid, which can optionally be dissolved in an organic aprotic solvent, is then added in appropriate amounts in a period of, e.g., one hour. The reaction solution is then stirred at 80° C. until the acid number of the solution is less than 1 mg KOH/g solid resin.

In order to synthesise an acryloyl- and epoxide-functionalised resin, TMI and glycidyl methacrylate can also be optionally copolymerised with other (meth)acrylic acid esters by radical solution polymerisation. By the addition of hydroxy-functionalised (meth)acrylic monomers, in which the free isocyanate groups of the copolymerised TMI are linked with the hydroxy function of the (meth) acrylic monomers via a urethane bond, the acryloyl function is added to the polymer subsequent to the polyreaction.

Examples of such hydroxy-functional (meth)acrylic monomers are hydroxyethyl (meth)acrylate, hydroxypropyl (meth) acrylate, butane diol monoacrylate, and/or the addition product of hydroxyethyl methacrylate and caprolactone. Addition of the hydroxy acrylate to the TMI copolymer takes place, for example, in a temperature range from 20 to 80° C., preferably 20 to 60° C.

Catalysis can optionally be effected by adding 0.1 to 1% by weight of a Lewis acid such as dibutyl tin laurate.

Crosslinking of the binding-agent component containing acryloyl and epoxide groups is effected with compounds having at least two primary amine functions. In order to bring about effective crosslinking of the binding-agent components A and B it is preferred that at least a proportion of the components A and/or B is trifunctional. It is of course also possible to use exclusively tri- and multifunctional components A and/or tri- and multifunctional components B.

The polyamines of component B used as curing agents according to the invention are produced by reacting TMI copolymers having a number average molecular weight (Mn) of 1000 to 10000 with mono- and/or diketimines and/or mono- and/or dialdimines which contain either an OH or a sec. NH grouping. For simplicity hereinafter the term 'ketimine' is used throughout, which however should in each case be taken to include aldimines.

By way of comonomers for production of the TMI copolymers all conventional monomers capable of vinyl polymerisation without OH functionality can be used, for example esters of (meth) acrylic acid such as methyl, ethyl, butyl, isobutyl, ethylhexyl, cyclohexyl and/or lauryl (meth)acrylate, and also styrene, vinyl toluene and/or α-methyl styrene. Production of the copolymers is effected by conventional radical solution polymerisation, familiar to one skilled in the art. Use is made, for example, of aprotic organic solvents such as aromatic solvents (e.g., toluene, xylene) and esters (e.g., butyl acetate).

Generally used in this regard are conventional radical initiators such as peroxides and azo-compounds. Reaction is effected, e.g., subject to heating, for example at temperatures from 80 to 140° C.

The monomeric TMI can be copolymerised within a range from 3 to 40% by weight, relative to the weight of all monomers, but preferably within a range from 5 to 25% by weight.

The isocyanate-terminated copolymer is then reacted with OH- or sec.-NH-functionalised mono- or diketimines.

Production of the ketimines, which however, as stated above, also include aldimines, is effected, e.g., by reaction of alkanol amines or di- or triamines having at least one primary amino group, and which in the case of di- or triamines additionally contain a secondary amine function, with aldehydes and/or ketones, water being split off.

Examples of alkanolamines are:
monoethanol amine, monopropanol amine, monohexanol amine or 2-amino-2-hydroxy-propane.

Examples of di- or triamines which have at least one primary amino group and a secondary amino group, are:
n-methylpropyl amine, diethylenetriamine, dipropylenetriamine or bishexamethyltriamine.

In order to produce the TMI-acrylate/ketimine adducts the primary amino groups of the amines named above must be blocked.

In this connection the primary amines are reacted with aldehydes or ketones, whereby water is split off, to form Schiff's bases or, respectively, aldimines or ketimines.

Examples of such aldehydes or ketones are:

C₃–C₁₀ compounds, such as hexyl aldehyde, octyl aldehyde, diisopropyl ketone and/or methyl isobutyl ketone.

The two latter compounds are particularly preferred, since they only exhibit a slight tendency towards side reactions.

In the process of addition to the isocyanate-terminated copolymer the OH- or sec.-NH-functionalised mono- or diketimines are preferably used in less than the usual quantity, preferably 90–95% of the isocyanate groups are reacted with OH or NH groups. The remaining excess isocyanate groups are urethanised in a final reaction stage with monoalcohols such as ethanol, propanol or butanol.

In order to synthesise the ketimine- or aldimine-functionalised (blocked) polyamines, a TMI copolymer is, for example, first produced by radical solution polymerisation. Then an alkanol amine or di- or triketimine, which has at least one primary function and also a secondary amine function, is introduced with the desired blocking agent aldehyde or ketone in an organic solvent which forms an azeotropic mixture with water. By heating this mixture, the reaction water produced is distilled off azeotropically.

It is advantageous to carry out production in an atmosphere of inert gas. The blocking agent can be used in excess, which subsequent to the reaction can be distilled off. It is advisable to choose by way of blocking agent a ketone/aldehyde which itself forms an azeotrope with water, so that no additional organic solvent is needed. With a view to addition of the OH- or sec.-NH-functionalised ketimine or aldimine to the isocyanate-terminated copolymer the ketimine is introduced at, e.g., 80° C. in an atmosphere of inert gas and the copolymer is added in appropriate amounts, e.g., in a period of two hours. The reaction can optionally be catalysed with the aid of a Lewis acid such as dibutyl tin laurate. After charging is complete and provided that the ketimine is present in deficiency, an alcohol, e.g. butanol, is added. Stirring is also optionally effected at more elevated temperature for, e.g., about 10 to 30 min.

The above-stated production method represents merely one example of a particular processing mode. In another mode, for example, the copolymer is introduced and the ketimine is added.

In the binding agents according to the invention the proportion of the equivalent weights of components A and B is of the order of 2:0.5 to 1:1.5, preferably about 2:0.5 to 1.

The equivalent weight in this sense should be taken to mean the weight in g containing one mole of the functional group. In the case of component A this is one mole of the total number of functional groups of epoxide and acryloyl groups.

In the case of component B it is one mole of the amine functions.

The binding-agent compositions according to the invention can be formulated in the customary manner into coating agents, for example lacquers. This is generally carried out by adding solvents and/or water. In this case it is possible to prepare a mixture of the two components A and B and to process these into coating agents in the customary manner by the addition of solvents and/or water and conventional additives. It is also possible, however, firstly to process one of the components A or B by adding solvents and/or water and conventional additives and then to add the other component.

Suitable organic solvents for producing coating agents, for example lacquers, are those which are also used to produce the individual components A and B. Examples of such solvents are organic solvents, such as aliphatic and aromatic solvents, such as aliphatic and aromatic hydrocarbons, for example toluene, xylenes, mixtures of aliphatic and/or aromatic hydrocarbons, esters, ethers and alcohols. These are conventional lacquer solvents. In order to produce the coating agents from the binding agents according to the invention, aqueous solutions can also be prepared. Emulsifiers such as are customary in the lacquering industry can optionally be used to this end.

In order to produce the coating agents, conventional additives such as are customary in the lacquering industry can be added.

Examples of such additives are pigments, for example colour-producing pigments, such as titanium dioxide or carbon black, and effect-creating pigments such as metallic-flake pigments and/or pearly-sheen pigments. The binding-agent compositions according to the invention are particularly well suited for coating agents which contain effect-creating pigments of these types. They preferably contain effect-creating pigments together with colour-creating pigments or colour-creating pigments together with filler materials. Further examples of additives are filler materials such as talc and silicates, emollients, light-absorbing agents, stabilisers and levelling agents such as silicon oils.

The binding-agent compositions according to the invention are so-called two-component systems. This means that the components A and B are stored separately and only mixed prior to use or with a view to their use, for example to produce coating agents. The coating agents produced from the binding agents according to the invention are then set to the desired application viscosity by suitable regulation of the addition of solvents, water and/or additives.

In accordance with the proportion of component A to component B and equivalent weight, the coating agents can be adjusted to have pot-life times between 1 and 24 hours, thereby ensuring long availability for use of the coating agents produced from the two-component binding-agent system. Application of the coating agents produced in this way can be effected in conventional manner, for example by dipping, spraying, brushing or by electrostatic means.

Curing of the coatings created by the coating agents can be carried out in a relative humidity of 20 to 90% in a wide temperature range from 10 to 180° C., but preferably between 20 and 80° C.

From the binding agents according to the invention various types of coating agents can be produced, for example lacquers which can be prepared as pigmented surface lacquers or as clear lacquers. They are also suitable, however, for producing fillers, for example.

The coating agents produced from the binding agents according to the invention are suitable for coatings which adhere to a plurality of substrates, such as wood, textiles, plastic, glass, ceramics and, in particular, metal. The coating agents can also be used in a multi-layer process. In this connection they can, for example, be applied to primers, basecoat lacquers, fillers or to existing surface lacquers. Application can either be effected onto the cured earlier coats or carried out wet-on-wet, after which joint stoving of the multi-layer coatings takes place.

All conventional types of precoating are suitable.

If the coating agents produced from the binding agents according to the invention are formulated as clear lacquers they can be applied, for example, to aqueous or non-aqueous basecoat lacquers in the process of effecting multi-layer coatings. Application of the clear lacquers can, as stated, after stoving, drying and, optionally, brief exposure to air, be carried out wet-on-wet, whereupon in the latter case stoving is then effected jointly.

Stated below are some examples of basecoat lacquers which can preferably be coated with clear or surface lacquers prepared from the binding agents according to the invention:

Water-based lacquers based on 50–95% by weight of an aqueous, epoxide-functionalised emulsion polymer and 95 to 5% by weight of an anionic polyurethane dispersion with an acid number of 5 to 10. Particularly suitable by way of grinding resins for pigments and additives used in such water-based lacquers are poly(meth)acrylate resins (for example, in a quantity of up to 20% by weight). Examples of such water-based lacquers are described in DE-OS 3 628 124.

Basecoat lacquers based on polyesters having a second-order transition temperature of $>30°$ C., melamine resins (e.g., partially butylated melamine resins), polycarbamide plasticisers (for example, based on an adduct of butyl urethane and formaldehyde) and a copolymer formed from polyethylene (85% by weight) and vinyl acetal (15% by weight) as wax dispersion. Such basecoat lacquers can contain conventional additives such as cellulose acetobutyrate (for example, with differing ranges of molecular weight). Examples of such basecoat lacquers are described in EP-A-187 379.

An aqueous basecoat lacquer suitable for repair purposes (particularly suitable for metallic lacquer coatings) contains 50 to 90% by weight of polyurethane with carbonate groupings and a number average molecular weight of 70000 to 500000, based on reaction products of polyisocyanates with polyhydroxy compounds and a proportion of polyhydroxy polycarbonates, and 10 to 50% by weight of polyurethane with a number average molecular weight of 20000 to 60000. Examples of such lacquers are described in DE-OS 41 15 015.

An example of a particularly suitable aqueous basecoat lacquer for repairs (in particular for uniform colours) contains 50 to 90% by weight of polyurethane having carbonate groups and a second-order transition temperature of $<0°$ C., based on reaction products of polyisocyanates with polyhydroxyl compounds with a proportion of polyhydroxyl carbonates, and 10 to 50% by weight of reaction products of carboxylic-functional condensation polymers and $\alpha,\beta$-olefinically unsaturated monomers with a second-order transition temperature of $>0°$ C. in the form of an aqueous dispersion. Examples of such aqueous basecoat lacquers are described in DE-A-41 15 042.

An example of basecoat lacquers based on solvents, which are particularly suitable for repair purposes, contains physically drying binding agents based on thermoplastic polyester resin and/or acrylic resin in a mixture with cellulose ethers or cellulose esters and/or polyvinyl acetates. In addition they contain self-curing acrylic-resin binding agents which contain colour-creating pigments and have hydrogen atoms that react with isocyanate, and also mixtures of cellulose ethers and/or cellulose esters and/or cellulose semi-esters dissolved in solvents. Such lacquers are described in DE-OS 29 24 632.

All the aforementioned basecoat lacquer formulations can contain conventional additives in addition to conventional fillers and colour-creating pigments, as well as metallic pigments such as aluminium or high-grade steel bronzes and other effect-creating pigments.

Other examples of basecoat lacquers which can be coated with clear lacquers based on binding agents according to the invention are powder lacquers such as are described in "Products Finishing" April 1976, pages 54 to 56.

A preferred area of application for the binding agents according to the invention is the provision of coating agents for lacquer coatings in the automobile industry. By virtue of their advantageous curing conditions these are particularly suitable for repair lacquering of automobiles.

The present invention consequently relates also to processes for producing coatings on various substrates, in which processes a coating agent produced from the binding agents according to the invention is applied to the substrate, whereupon drying and curing takes place. The invention also relates to the use of the binding-agent composition according to the invention in clear lacquers, fillers or surface lacquers, particularly in the automobile industry.

In any case, with the coating agents produced from the binding agents according to the invention films are obtained having a good sheen, good hardness and good resistance to water and solvents, in particular to super gasoline. Curing is effected very rapidly; a bone-dry finish, for example, can be achieved within just a few minutes, e.g. about 10 minutes.

The following Examples serve to elucidate the invention. All parts stated are parts by weight.

EXAMPLE 1

1) Production of an Acryloyl- and Epoxide-Functionalised Acrylic Resin

1a) Production of a Glycidyl Methacrylate Copolymer

In a 4-liter three-necked flask equipped with stirrer, thermometer, drip funnel and reflux condenser, 1000 parts of xylene are introduced and heated with stirring to 90° C. Within 5 h a mixture consisting of
  380 parts of glycidyl methacrylate
  128 parts of butyl methacrylate
  252 parts of butyl acrylate
  200 parts of styrene and
  40 parts of tert. butyl peroctoate
was added dropwise. The epoxy-functional resin obtained has a viscosity of 70 mPas (25° C.) and a solids content of 50.1% (1 h/150° C.).

1b) Production of the Acryloyl- and Epoxide-Functionalised Acrylic Resin 2000 parts of the glycidyl-functionalised resin from 1a) are heated with 4.8 parts of triphenyl phosphite, 0.9 parts of methyl hydroquinone and 500 parts of butyl acetate 98/100 to 90° C. with stirring in a 4-liter flask equipped with stirrer, thermometer, drip funnel and reflux condenser. At this temperature a mixture consisting of 110 g acrylic acid and 250 g butyl acetate 98/100 is added dropwise within 5 h, then reacted until an acid number of 1 is obtained. The resin is adjusted by distillation to give a solids content of 60% and then has a viscosity of 520 mPas.

1c) Production of a Binding Agent in the Form of an Aqueous Emulsion 1800 parts of the acryloyl- and epoxide-functionalised acrylic resin from Example 1b) are adjusted appropriately by distillation to give a solids content of 80%. In order to produce an aqueous emulsion, 236 g of completely softened water is now introduced with 0.19 g of a commercial polysiloxane defoaming agent and heated to 45° C. 510 g of the acrylic resin obtained as described above are mixed with 20.3 g of a polyoxyethylene-polyoxypropylene alkylphenol emulsifier and heated to 75° C. With the aid of a rotor/stator homogeniser this resin is sheared and emulsified in the water/polysiloxane mixture. Dosing is effected within 8 minutes. The rotor has a speed of rotation of 10000 revolutions per minute.

While charging takes place, the charge is cooled with warm water at 45° C. The milky-white emulsion obtained has a solids content of 53.7%, a viscosity of 41 mPas and an average particle size, determined by photon correlation spectroscopy, of 755 nm.

EXAMPLE 2

2) Production of a Ketimine-Functionalised Acrylic-resin Curing Agent with Carbamide Groups 2a) Production of a TMI Copolymer In a 4-liter three-necked flask equipped with stirrer, thermometer, drip funnel and reflux condenser, 925 parts of xylene are introduced and, with stirring, heated to reflux. Within 5 h a mixture consisting of
  250 parts of methyl methacrylate
  750 parts of isobutyl acrylate
  225 parts of m-TMI
  225 parts of styrene
  50 parts of tert.-butyl peroctoate
is added dropwise. Then for 4 h stirring is effected at the reflux stage. The isocyanate-functional resin obtained is then added to xylene until a solids content of 60% (1 h/150° C.) is obtained. The resin then has a viscosity of 230 mPas.

2b) Production of the Ketimine

In a 2-liter three-necked flask equipped with stirrer, thermometer, drip funnel and reflux condenser, 312.5 parts of dipropylenetriamine and 1000 parts of methyl isobutyl ketone were introduced in an atmosphere of inert gas and heated to reflux. The reaction mixture is stirred at the reflux stage until such time as no further reaction water is separated (83.5 parts of $H_2O$=93% theoretical value).

2c) Production of the Ketimine-functionalised Acrylic Resin

In a 2-liter three-necked flask, equipped with stirrer, thermometer, drip funnel and reflux condenser, 248 g of the ketimine described in 2b) is introduced in an atmosphere of inert gas and heated to 30° C. Within 2 h around 1000 g of the isocyanate-terminated acrylic resin described in 2a) were charged continuously. Once charging is complete the mixture is heated to 80° C. and stirred until no free isocyanate is any longer present (no NCO bonds any longer visible in the infra-red spectrum at around 2240 cm$^{-1}$). The ketimine-functionalised acrylic resin resulting then has a solids content of 60.8% (1 h/150° C.) and a viscosity of 410 mPas.

2d) Production of an Aqueous Emulsion of the Resin in 2c).

In a 1-liter flask 125 g of completely softened water, 9.0 g of an emulsifier based on a polyoxy-propylenepolyoxyethylene sorbic acid diester of unsaturated fatty acids and 0.1 g of a commercial polysiloxane defoaming agent were introduced at 60° C. The mixture is stirred with a stirrer which rotates at a speed of about 7500 h/min. Then 200 g of the ketimine-functionalised acrylic resin from 2c), having been concentrated by distillation to give a solids content of 90% and then heated to 60° C., is added within three minutes at 60° C. The milky-white emulsion obtained has a solids content of 55.6% and a viscosity of 110 mPas.

EXAMPLE 3

3) Production of a Ketimine-Functionalised Acrylic Resin with Urethane Grouping

3a) Production of a TMI Copolymer

In a 4-liter three-necked flask equipped with stirrer, thermometer, drip funnel and reflux condenser, 800 parts of xylene are introduced and, with stirring, heated to reflux. Within 5 hours a mixture consisting of
  200 parts of methyl methacrylate
  460 parts of isobutyl acrylate
  500 parts of m-TMI
  40 parts of tert. butyl peroctoate
were added dropwise. Then for another four hours stirring is effected at the reflux stage. The isocyanate-functional resin obtained is then added to xylene until a solids content of 60% (1 h/150° C.) is obtained. The resin then has a viscosity of 260 mPas.

3b) Production of a Ketimine

In a 2-liter three-necked flask equipped with stirrer, thermometer, drip funnel and reflux condenser, 85 parts of monoethanol amine and 280 parts of methyl isobutyl ketone are introduced in an atmosphere of inert gas and heated to reflux. Stirring is effected at the reflux until such time as no further reaction water is separated (24.8 parts $H_2O$=99.1% theoretical value).

3c) Production of the Ketimine-Functionalised Acrylic Resin

In a 2-liter three-necked flask equipped with stirrer, thermometer, drip funnel and reflux condenser, 340 parts of the ketimine described in 3b) are introduced and heated to 30° C. Then 33 parts of a 10% dibutyl tin laurate solution in xylene are added. Within two hours 1124 parts of the isocyanate-functional acrylic resin described in 3a) are now charged continuously. After charging is complete the mixture is heated to 80° C. and stirred until no free isocyanate is any longer present (no NCO bonds any longer visible in the infra-red spectrum at around 2240 cm$^{-1}$). The ketimine-functionalised acrylic resin obtained then has a solids content of 56.0% (1 h/150° C.) and a viscosity of 2240 mPas.

Production of Lacquers

EXAMPLE 4 a) Production of the primary lacquer:
  60.24 parts of the glycidyl- and acryloyl-functionalised resin from Example 1b)

0.18 parts of a levelling agent based on a commercial silicon oil (10% in butyl acetate 90/100)
0.45 parts of a solution of a sterically hindered amine (UV stabiliser)
0.45 parts of a benzotriazol derivative
38.68 parts of a diluent:
10% butyl glycol acetate
25% butyl acetate 98/100
40% methoxypropyl acetate
25% xylene
are mixed homogeneously.

b) Production of the Curing Agent Solution:
80.2 parts of the carbamide-bridged ketimine-functionalised acrylic resin from Example 2c)
19.8 parts of a diluent (as above)

c) Lacquer production: 2 parts of the primary lacquer from 4a) and 1 part of the curing-agent solution from Example 4b) were mixed with one another homogeneously and adjusted with the aforementioned diluent to give a spraying viscosity of 18″ according to DIN 53211 and applied wet-on-wet, on a commercial basecoat lacquer based on organic solvents, in two spray passes, with a dry-film thickness of 40 to 100 μm.

EXAMPLE 5 a) Production of the Primary Lacquer:
67.09 parts of the glycidyl- and acryloyl-functionalised resin from Example 1b)
0.15 parts of a levelling agent based on a commercial silicon oil (10% in butyl acetate 98/100)
0.36 parts of a solution of a sterically hindered amine
0.36 parts of a benzotriazol derivative
32.04 parts of a diluent (see above)
are mixed homogeneously.

b) Production of the Curing Agent Solution:
57 parts of the urethane-bridged ketimine-functionalised acrylic resin from Example 3c)
43 parts of the above-stated diluent c) Lacquer Production:
The primary lacquer from Example 5a) and the curing-agent solution from Example 5) are mixed with each other homogeneously and adjusted with the aforementioned diluent to give a spraying viscosity of 18″ according to DIN 53211 and applied wet-on-wet, on a commercial basecoat lacquer based on organic solvents, in two to three spraying passes, with a dry-film thickness of 40 to 100 μm.

EXAMPLE 6

20 g of the aqueous resin solution from Example 1c) and 7 g of the aqueous curing-agent solution from Example 2d) are mixed and spread by blade onto a glass plate to a film thickness of 60 μm.

Assessment of the Lacquer Films

The lacquers from Examples 4c), 5c) and 6 are stoved for 30 minutes at 60° C. One hour after stoving the lacquer films exhibited very good resistance to gasoline, good slip characteristics and very low sensitivity to scratching.

What is claimed is:

1. Binding-agent composition for coating agents containing solvents and/or water, containing
   A) one or several binding-agent components based on at least one member selected from the group consisting of polyethers, polyesters, polyether polyesters and (meth)acrylic copolymers with in each case at least one acryloyl group and at the same time at least one epoxide group in the molecule, whereby the acryloyl groups and epoxide groups are present in the numeric ratio 2:8 to 8:2, and
   B) one or several polyamines with, by way of curing agents, at least two primary amine functions, which are blocked, in the molecule, produced by reaction of vinyl copolymers of α-dimethyl-m-isopropenylbenzylisocyanate having a number average molecular weight (Mn) of 1000 to 10000 with at least one member selected from the group consisting of mono- and diketimines and mono- and dialdimines which contain at least one OH or secondary NH group,
whereby the components A) and B) are present in a proportion of equivalent weights of 2:0.5 to 1:1.5.

2. Binding-agent composition according to claim 1, in which the acryloyl group of component A) has the general formula

$$R_1R_2C = CR_3 - COO-$$

where $R_1$, $R_2$ and $R_3$ are the same or different and are a hydrogen atom or a straight or branched alkyl residue with 1 to 10 carbon atoms.

3. Binding-agent composition according to claim 2, in which he binding-agent component A) is obtained by reaction of at last one member selected from the group consisting of di- and polyepoxides based on polyglycidyl ethers of aliphatic, cycloaliphatic or aromatic diols or polyols having a number average molecular weight (Mn) of up to 2000, polyglycidyl esters having a number average molecular weight (Mn) of 500 to 2000 and glycidyl-functionalised (meth) acrylic copolymers having a number average molecular weight (Mn) of 1000 to 10000 with αkβ-ethylenically unsaturated monocarboxylic acids having 2 to 10 atoms, which can have additional ethylenic double bonds.

4. Coating agent containing the binding-agent composition according to any of claims 1 to 3 further comprising at lease one member selected from the group consisting of organic solvent and water, and optionally, at least one for member selected from the group consisting of pigments and filler materials.

5. Process for producing a coating agent according to claim 4, characterized in that the binding-agent component A) is produced according to claim 4 and is mixed with one or several polyamines as defined for component B) of claim 1, and also with one or several organic solvents and/or water, and optionally one or several pigments and/or filler materials.

* * * * *